United States Patent

[11] 3,589,257

| [72] | Inventor | Michio Horiuchi<br>Tokyo, Japan |
|---|---|---|
| [21] | Appl. No. | 743,762 |
| [22] | Filed | July 10, 1968 |
| [45] | Patented | June 29, 1971 |
| [73] | Assignee | Dai Nippon Insatsu Kabushiki Kaisha<br>Tokyo, Japan |
| [32] | Priority | Apr. 2, 1968 |
| [33] | | Japan |
| [31] | | 43/21188 |

[54] TRACKING OR SCANNING DEVICE
4 Claims, 5 Drawing Figs.

[52] U.S. Cl. .................................................. 95/18, 95/36
[51] Int. Cl. .................................................. G03s 35/08
[50] Field of Search ............................................ 95/18 P, 86, 36

[56] References Cited
UNITED STATES PATENTS

| 2,150,932 | 6/1936 | McDonnell | 95/18 P |
| 2,158,660 | 5/1939 | Kanolt | 95/18 P |
| 2,562,077 | 7/1951 | Winnek | 95/18 P |
| 2,572,994 | 10/1951 | Dudley | 95/18 P |
| 3,392,648 | 7/1968 | Bartholomew | 95/86 |

*Primary Examiner*—Samuel S. Matthews
*Assistant Examiner*—D. J. Clement
*Attorney*—Wenderoth, Lind and Ponack

ABSTRACT: Apparatus for aiming a camera at a center of a subject in order to take a stereoscopic picture. A base is movable along a straight line path and has a plate thereon with a groove in it. A device for controlling the angle of inclination of the groove with respect to the direction of the straight line path is provided and a further device is provided for transmitting the linear motion derived from the rotation of a threaded rod to drive a nut along the groove to a table. The table is pivoted to the base at one end and engaged with the communication device at the other end, and a camera is positioned on the table.

INVENTOR
MICHIO HORIUCHI

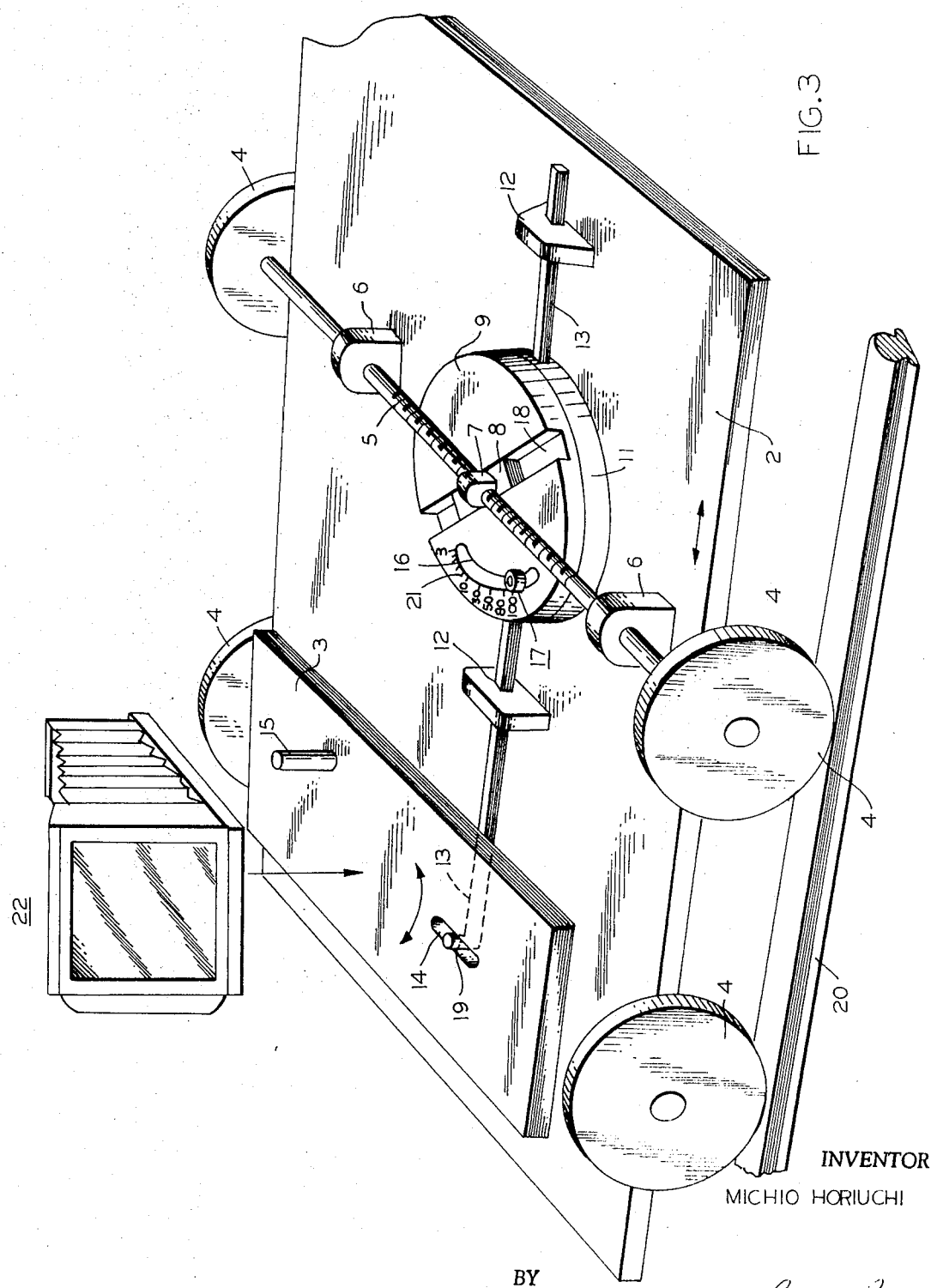

TRACKING OR SCANNING DEVICE

This invention relates to an apparatus for aiming a camera at a center of a subject in order to take a stereoscopic picture with the camera. Still more particularly, in this aspect, this invention relates to an apparatus for aiming at a center of a subject in order to take a stereoscopic picture, which comprises a base which is movable along a straight line path, a plate on the base and provided with a groove, a device for controlling the angle of inclination of the groove with respect to the direction of the straight line path, a coupling device for transmitting a linear motion derived from the rotation of a threaded rod to drive a nut along the groove, said table being pivoted to the base at one end and engaged with an end of the coupling device at the other end and a camera placed on the table.

In accordance with the prior art, stereoscopic pictures are produced by taking a series of pictures of a subject by moving either a camera or the subject, or simultaneously taking a plurality of pictures of a resting subject by using a plurality of cameras and then projecting the pictures onto a photosensitive film placed behind a lenticulated screen. Also, British Pat. No. 939,022 discloses a method for taking a series of pictures with a camera whose photosensitive material is moved along a straight line, while its optic axis is kept directed at a center of a subject. It is, however, noted that such pictures are not stereoscopic pictures. For carrying out the method as disclosed in this patent, it is necessary to use an objective mount which is moved horizontally in relation to the rest of the camera on a guide and also to use a guide mechanism comprising a pair of inclined planes of which the first one is arranged to move the second vertically. For carrying out the prior art as mentioned above, it is necessary to place a subject on a rotating plate or circulate a camera around the subject in an arc and therefore such a method is not suitable for photographing a scene in the open air and also, the above-mentioned patent has the defects that a special camera having a slidable objective must be used in combination with a guide mechanism. When the guide mechanism is fixed to a guide rail, the guide rail can not be folded and therefore the guide rail is not readily portable.

In order to eliminate the above defects inherent in the prior art techniques, this invention provides an apparatus for aiming at a center of a subject in order to take a stereoscopic picture with a camera. By using the apparatus according to this invention, the camera can track the subject while its optical axis is kept directed at the center of the subject without the horizontal movement of the camera an objectionable distance by using a special mechanism, as fully explained hereinafter, for controlling the movement of the conventional camera which is placed on a table. Therefore, the apparatus of this invention can be used for the production of a stereoscopic picture continuously or intermittently by using a single camera. Thus, the apparatus of this invention provides an important advantage achieved by eliminating the technique for projecting an image onto a sheet of photosensitive material placed behind a lenticulated screen or a lenticular lens by means of a projector being moved along a line parallel to the screen.

It is therefore an object of this invention to provide an apparatus for aiming at a center of a subject in order to take stereoscopic picture continuously or intermittently by using a single camera.

A further object of this invention is to provide an apparatus for tracking a center of a subject which can easily be constructed and is lightweight and portable.

The apparatus of this invention will now be explained with reference to the attached diagrammatic drawings.

FIG. 3 is a perspective view of an apparatus for aiming at a center of a subject according to this invention.

Figure 1:
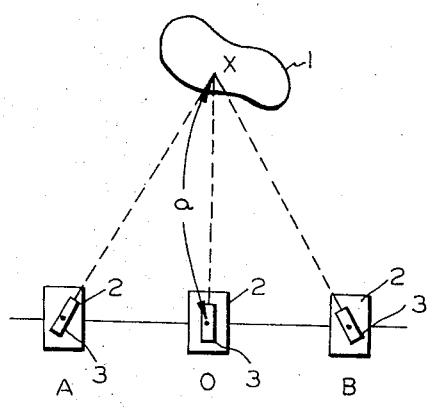
FIGS. 1 and 2 are diagrammatic plans illustrating the principle of this invention.
Figure 2:
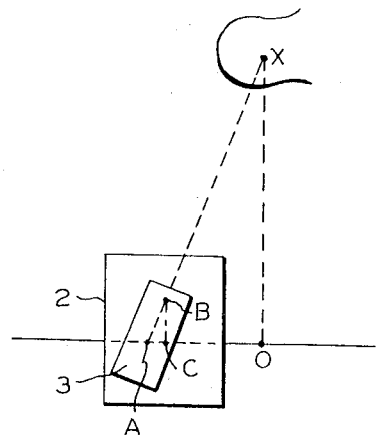

As shown in FIG. 1, a base 2 is placed on the point 0 perpendicular to a center point X of a subject 1, and assuming that the base 2 is moved along a straight line path for a distance as shown by $\overline{AB}$ while the optical axis of a camera placed on a table 3 is kept directed at the center point X of the subject. In this case, the distance $a$ between the center point X and the camera placed on the table 3 at the point 0 can be given a desired value. Now, referring to FIG. 2, it shows a table 3 having a rotating axis indicated by a point B. The point C is a projection of the point B which is projected on the line $\overline{OA}$. Thus, let us consider the two right-angle triangles $\triangle ABC$ and $\triangle AXO$. If $\triangle ABC$ and $\triangle AXO$ are similar figures, the angle "ABC" is equal to the angle "AXO" and the optical axis of the camera is kept directed at the center point X of the subject 1. Therefore, when the camera is placed on the table 3 which is movable around the point B and the table 3 is fixed to the base 2 and then the point C is moved for a distance as indicated by the formula AC=CB·OC/OX −CB during a period of movement of the base 2 for the distance as indicated by $\overline{OC}$, the optical axis of the camera can be kept directed at the center point of the subject. In other words, the optical axis of the camera is always kept directed at the center of the subject by moving the point C in a lower speed by reducing the speed of the base 2 moving along the line OA in the ratio of $\overline{AC}/\overline{OC}$.

Figure 4:
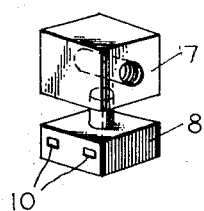
FIG. 4 is an enlarged perspective view of a special nut and a slide member engaged with the special nut as shown in FIG. 3.
Figure 5:
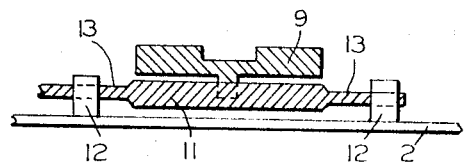
FIG. 5 is a vertical section view showing a plate, a groove, a member for fixing the plate thereto and an element for fixing the member to a base.

A preferred embodiment of this invention is illustrated in FIG. 3. As shown in FIG. 3, a camera 22 is on a base 2. The base 2 can be moved back and forth along a straight line path on a rail 20 by driving two pairs of wheels 4 and 4 driven by a power source (not shown). One pair of wheels 4 and 4 are fixed to a threaded rod 5 having a threaded portion and the threaded rod is rotatably held in bearings 6 and 6. The connecting portion of the connecting rod 5 has threaded thereon a special nut 7. The special nut 7 can be moved back and forth along the rod 5 as the wheels 4 and 4 move back and forth. As shown in FIG. 4, a slide member 8 having a bearing 10 is rotatably connected with the special nut 7. The slide member can be moved along a groove 18 disposed in a plate 9. The plate 9 is pushed by the special nut 7 as it moves back and forth and the groove 18 can be inclined up to an inclination angle of 90° with respect to the axis of the threaded rod 5. The bearing 10 eliminates a frictional resistance of the slide member 8 sliding along the groove 18. The plate 9 is fixed to a member 11 by means of a bolt 17. The member 11 is connected to a coupling means in the form of a rod 13 and the rod 13 is supported by two bearings 12 and 12 which are fixed to the base 2. The rod 13 can be moved back and forth along straight line path as shown by the arrow. The rod 13 has an extending portion and the end of the extending portion is bent upwardly to form a member 19. The camera 22 is placed on a table 3 and the table 3 is pivoted by a pivot 15 to the base 2 at one end and also has a slot 14 formed at the other end of the table 3. The slot 14 has the member 19 engaged therein. The table 3 can be moved from side to side around the pivot 15 as the rod 13 moves back and forth along the straight line path as shown by the arrow. The movement of the table 3 is controlled by the action derived from the inclination angle of the groove 18.

In order to aim at the center of the subject by the camera and direct the optical axis of the camera to the center of the subject, a slot 16 is provided in the plate 9. The slot 16 has a circumferential scale 21 indicating a distance (in meters) between the subject and the camera 22 placed on the table 3. The value indicated on the scale 21 is calculated by the following equation.

$$\tan\theta = \pi e d/(1000a-e)P$$

Wherein $\theta$ is the inclination angle of the groove 18 with respect to the direction of movement of the base 2, $a$ is the distance in meters between the subject and the camera, $P$ indicates the pitch in millimeters of the thread which is formed on the connecting rod 5, $d$ is the diagram in millimeters of the wheel 4 and *e* indicates the distance in millimeters between the pivot 15 and the member 19 formed at the end of the extending portion of the rod 13. When the subject is placed at a distance of 40 meters from the camera, the bolt 17 is placed on the point indicating the value of 40 on the scale 21 and the plate 9 is fixed to the member 11 by means of the bolt 17 and then the apparatus of this invention is operated for taking a stereoscopic picture continuously while the optical axis of the camera placed on the base 2 which is moved back and forth on the rail 20 is kept directed at the center of the subject.

What I claim is:

1. An apparatus for aiming a camera at the center of a subject in order to take a stereoscopic picture, comprising a base movable along a straight line path, a table having one end pivoted to said base, a camera on said table, a coupling rod having one end coupled to the other end of said table, a plate mounted on said coupling rod and having a groove therein, said plate being adjustable for changing the angle of inclination of said groove, a rotatable threaded rod on said base and rotatable an amount in proportion to the linear movement of said base, and means coupled between said threaded rod and said groove for moving said plate and said coupling rod linearly and thereby pivoting said table in proportion to the distance said base moves.

2. An apparatus as claimed in claim 1 in which said groove is a linear groove and said plate is movable to change the angle of inclination of said groove with respect to the axis of said threaded rod up to an angle of 90°.

3. An apparatus as claimed in claim 1 in which said means coupled between said threaded rod and said groove is a nut threaded on said threaded rod, and a slide member on said nut and slidable along said groove.

4. An apparatus as claimed in claim 1 in which said threaded rod has at least one wheel thereon which is adapted to roll on a surface along the straight line path of said base for rotating said threaded rod.